United States Patent
Yoshida et al.

(10) Patent No.: US 7,149,301 B2
(45) Date of Patent: Dec. 12, 2006

(54) REPEATING DEVICE, TELEPHONE SET, AND RECORDING MEDIUM

(75) Inventors: Takahiro Yoshida, Koriyama (JP); Masaru Noji, Koriyama (JP); Takahiro Sasaki, Koriyama (JP); Tadashi Saito, Koriyama (JP)

(73) Assignees: Hitachi Communication Technologies, Ltd., Koriyama (JP); Telecom Kiki, Ltd., Koriyama (JP)

( * ) Notice: Subject to any disclaimer, the term of this patent is extended or adjusted under 35 U.S.C. 154(b) by 975 days.

(21) Appl. No.: 09/964,334

(22) Filed: Sep. 28, 2001

(65) Prior Publication Data

US 2003/0063612 A1   Apr. 3, 2003

(51) Int. Cl.
*H04M 3/42* (2006.01)
*H04M 3/00* (2006.01)

(52) U.S. Cl. .................. 379/218.01; 379/211.01; 379/211.02; 379/212.01; 379/265.02

(58) Field of Classification Search .......... 379/211.01, 379/211.02, 212.01, 218.01, 265.01, 265.02
See application file for complete search history.

(56) References Cited

U.S. PATENT DOCUMENTS

| | | | | |
|---|---|---|---|---|
| 5,539,809 A | * | 7/1996 | Mayer et al. | 379/210.02 |
| 5,850,433 A | * | 12/1998 | Rondeau | 379/218.01 |
| 6,052,439 A | * | 4/2000 | Gerszberg et al. | 379/88.01 |
| 6,249,576 B1 | * | 6/2001 | Sassin et al. | 379/218.01 |
| 6,289,090 B1 | * | 9/2001 | Tessler et al. | 379/207.02 |
| 6,324,273 B1 | * | 11/2001 | Alcott | 379/201.03 |
| 6,404,876 B1 | * | 6/2002 | Smith et al. | 379/218.01 |
| 6,421,672 B1 | * | 7/2002 | McAllister et al. | 707/10 |
| 6,636,590 B1 | * | 10/2003 | Jacob et al. | 379/114.05 |
| 6,795,543 B1 | * | 9/2004 | Cartier et al. | 379/219 |
| 6,985,576 B1 | * | 1/2006 | Huck | 379/265.09 |

* cited by examiner

*Primary Examiner*—Bing Q. Bui
(74) *Attorney, Agent, or Firm*—Antonelli, Terry, Stout and Kraus, LLP.

(57) ABSTRACT

A repeating device 14 for relaying the call to a plurality of receiver telephones 12a–12c that are connected to a local area network, comprising a function for requesting a reply to the plurality of receiver telephones 12a–12c asking their availability to receive a call, a function for selecting the destination of the call out of the receiver telephones 12a–12c that responded, and a function for notifying the address of the selected receiver telephone 12a to the caller telephone 22a. Further, the present repeating device comprises a function for receiving the transfer request from a user.

5 Claims, 7 Drawing Sheets

REPEATING DEVICE, TELEPHONE SET, AND RECORDING MEDIUM

FIELD OF THE INVENTION

The present invention relates to a repeating device, a telephone set and a recording medium, and especially relates to the communication technology of relaying via a communication line telephone devices connected to a local area network and the like.

Figure 7:
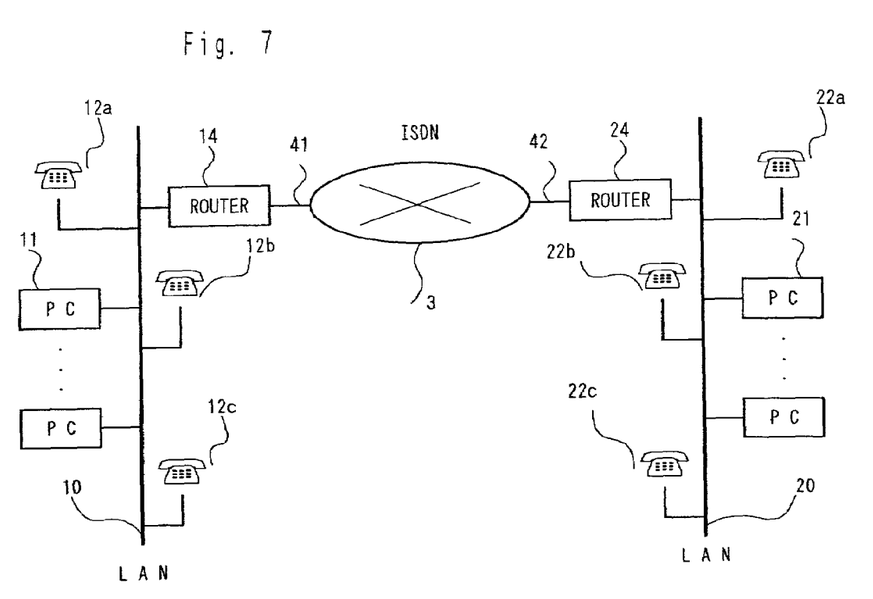
FIG. 7 is an explanatory view showing the minimum system environment for operating the LAN telephones and the repeating device.

Heretofore, voice communication between dedicated telephone sets connectable to a local area network (hereinafter called LAN telephone sets) and voice communication between personal computers (PCs) connected to the local area network are realized by a VOIP (Voice over IP) technology that processes the voice signal into packets and transmits the packets through the network. The prior art technology is shown in FIG. 7, wherein a PC 11 and telephone sets 12*a*–12*c* connected to the LAN 10 is connected via a router 14, an integrated services digital network (hereinafter called ISDN) 3, and connecting lines 41 and 42 to a PC 21 and telephone sets 22*a*–22*c* connected to the LAN 20.

According to the system shown in FIG. 7, the method of communication between LAN telephones that was conventionally realized using PCs is explained with reference to the sequence chart of FIG. 8 (VoIP system). The LAN telephone 22' of the caller party generates a call to the address of the LAN telephone 12', and the LAN telephone receiving the call returns a "reply (call OK)" to the LAN telephone 22', thereby starting the call, and after the call is finished, the call is disconnected.

Figure 8:
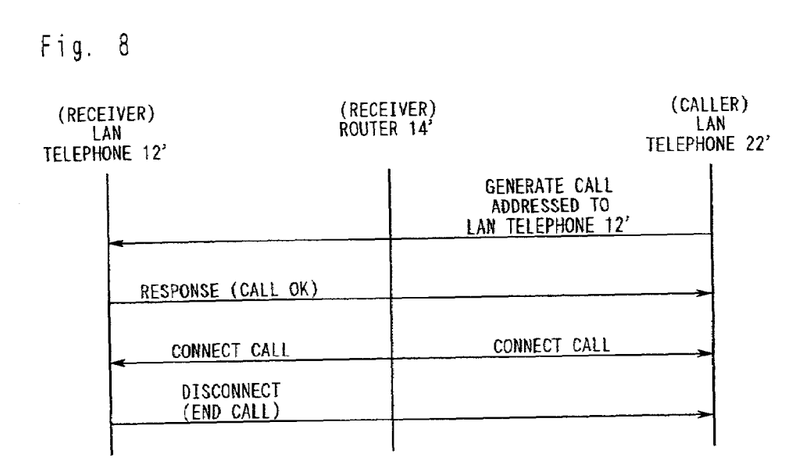
FIG. 8 is an explanatory view showing the operation of the LAN telephone according to the prior art.

According to the prior art, the communication method for realizing calls between LAN telephones connected either to the same local area network or to other local area networks having different subnet addresses via a subscriber line can be applied for communication designating a specific address, and as shown in FIG. 8, the call is generated, replied, connected, and disconnected. However, there are no proposals related to the communication method enabling communication between unspecified telephones connected to the local area network, such as communication between extension telephones (conventional branch-connected telephones). Further, there were no considerations on how to transfer calls.

SUMMARY OF THE INVENTION

The present invention provides a new communication system, and the object of the invention is to provide a repeating device, a telephone set and a recording medium enabling communication between LAN telephones that are either connected via communication lines to the same local area network or to local area networks having different subnet addresses, wherein the call from the LAN telephone can be realized without having to specify the receiver of the call.

The present invention provides a repeating device for relaying communication to a plurality of receiver-side telephones connected to a local area network, the repeating device comprising a function for requesting a response from said plurality of receiver-side telephones indicating their availability to receive a call, a function for selecting out of the plurality of receiver-side telephones that responded a telephone to which the call is to be connected, and a function for notifying the address of the selected receiver-side telephone to a caller-side telephone.

Moreover, the present invention provides a repeating device further comprising a function for receiving a transfer request from a user.

Further, the present invention provides a telephone capable of generating a call to a plurality of receiver-side telephones being connected to a local area network without designating the address of the receiver, the telephone comprising a function for requesting a response from said plurality of receiver-side telephones indicating their availability to receive a call, a function for selecting out of the plurality of receiver-side telephones that responded a telephone to which the call is to be connected, and a function for generating a call addressed to said selected telephone.

Even further, the present invention provides a telephone connected to a local area network, the telephone comprising upon receiving a transfer request from a user a function for requesting a response from a plurality of receiver-side telephones indicating their availability to receive a call, a function for selecting out of the plurality of receiver-side telephones that responded a telephone to which the call is to be connected, and a function for notifying the address of the selected telephone to a caller-side telephone.

Moreover, the present invention provides a recording medium capable of being read by a computer and storing a program to be executed by said computer, said recording medium used either for a device for relaying communication to a plurality of receiver-side telephones being connected to a local area network, a telephone being connected to a local area network, or a telephone capable of generating a call to a plurality of receiver-side telephones being connected to a local area network without having to specify the address of the receiver telephone, wherein the recording medium comprises any of the following sets of functions: a function for requesting a response from said plurality of receiver-side telephones indicating their availability to receive a call, a function for selecting out of the plurality of receiver-side telephones that responded a telephone to which the call is to be connected, and a function for notifying the address of the selected receiver-side telephone to a caller-side telephone; a function for requesting a response from said plurality of receiver-side telephones indicating whether or not they are capable of connecting a call, a function for selecting a telephone to which the call is to be connected out of the plurality of receiver-side telephones that responded, and a function for generating a call addressed to said selected telephone; or a function for requesting upon receiving a transfer request from a user a response from a plurality of receiver-side telephones indicating their availability to receive a call, a function for selecting out of the plurality of receiver-side telephones that responded a telephone to which the call is to be connected, and a function for notifying the address of the selected telephone to a caller-side telephone.

DETAILED DESCRIPTION OF PREFERRED EMBODIMENTS

The preferred embodiments according to the present invention will now be explained.

Figure 1:
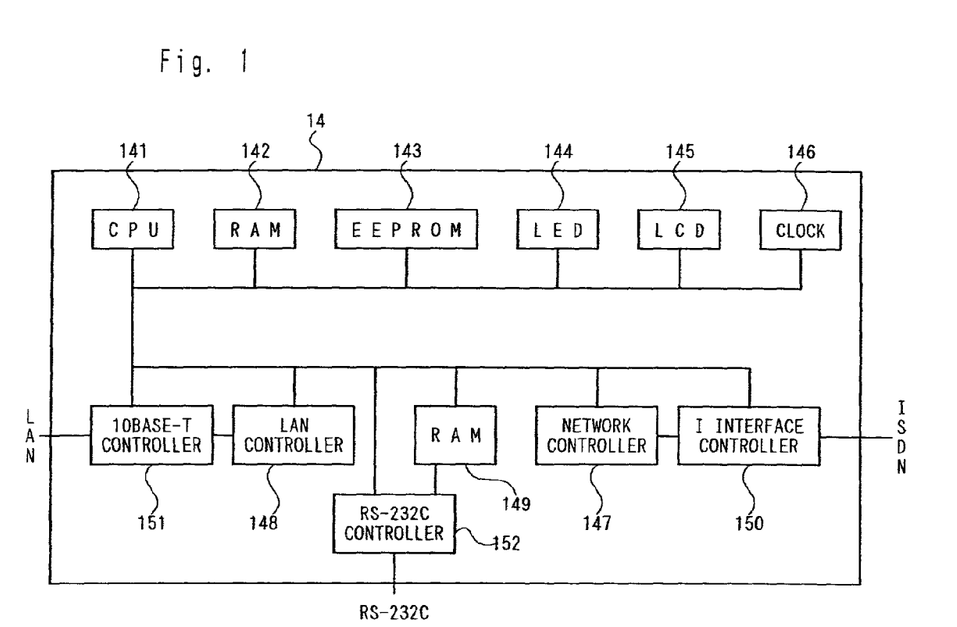
FIG. 1 is an explanatory view showing the functional structure of a logical block of the router according to embodiment 1.
Figure 2:
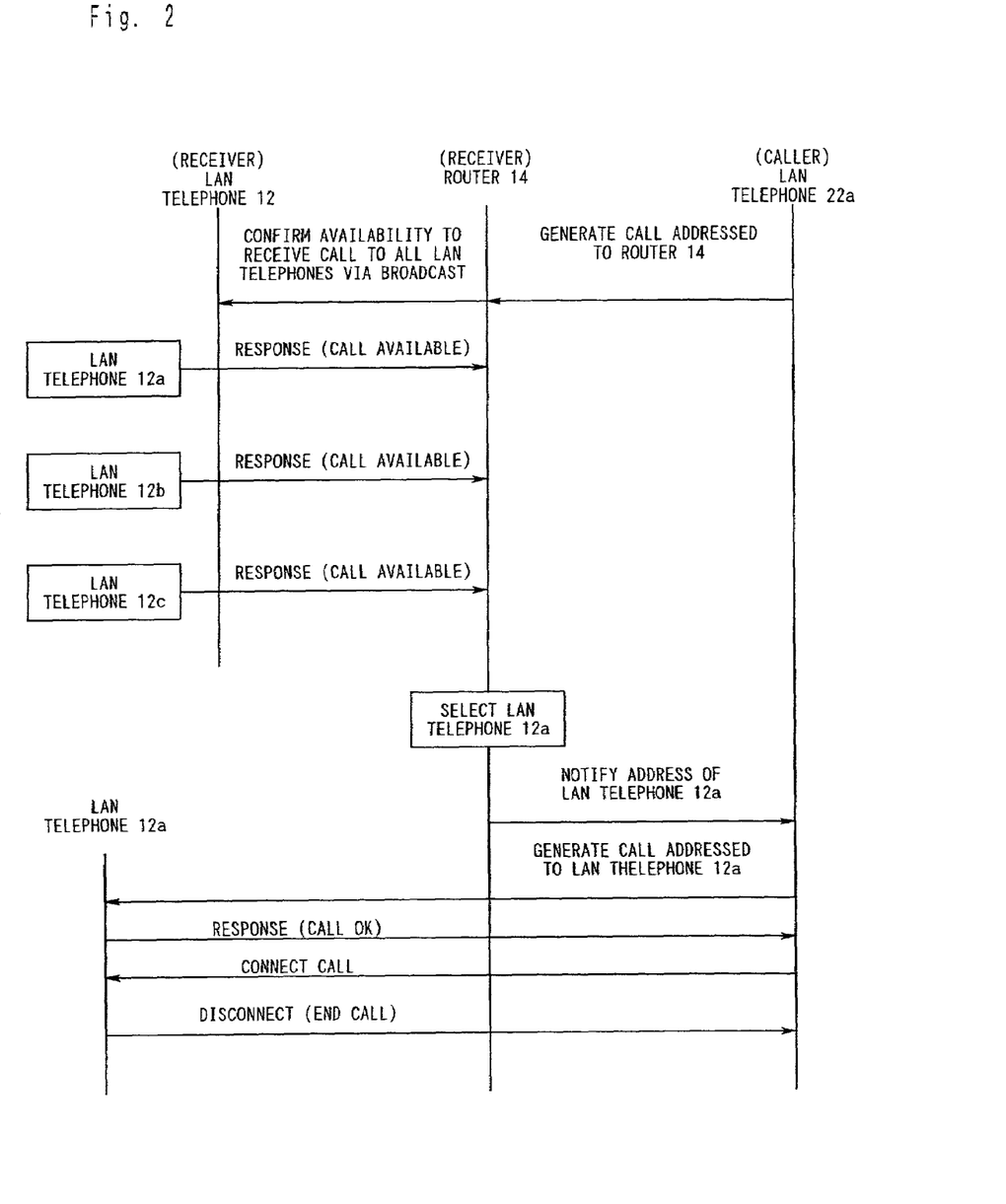
FIG. 2 is an explanatory view showing one example of the operation of the router according to embodiment 1.
Figure 3:
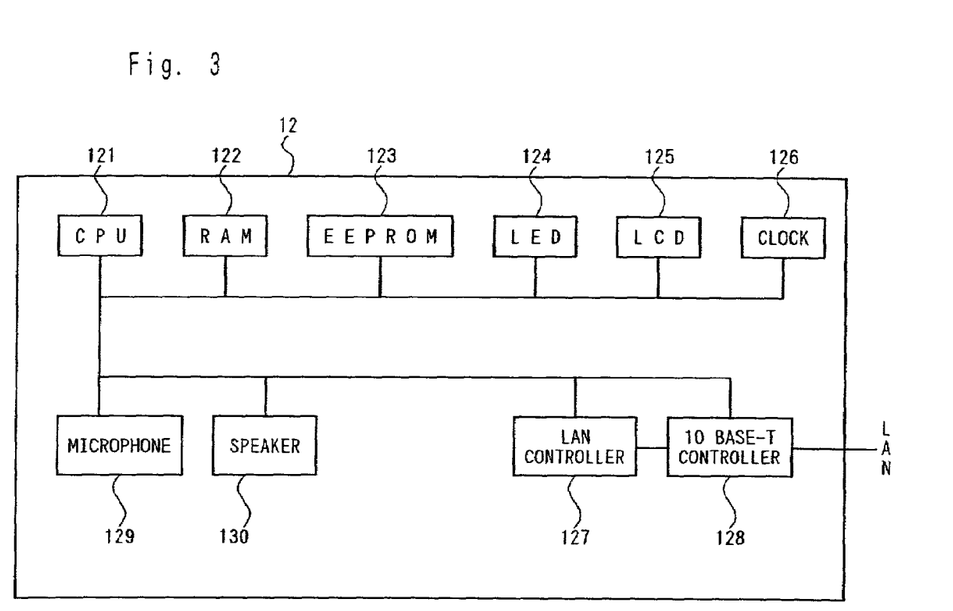
FIG. 3 is an explanatory view showing the functional structure of a logical block of the LAN telephone according to embodiment 2.
Figure 4:
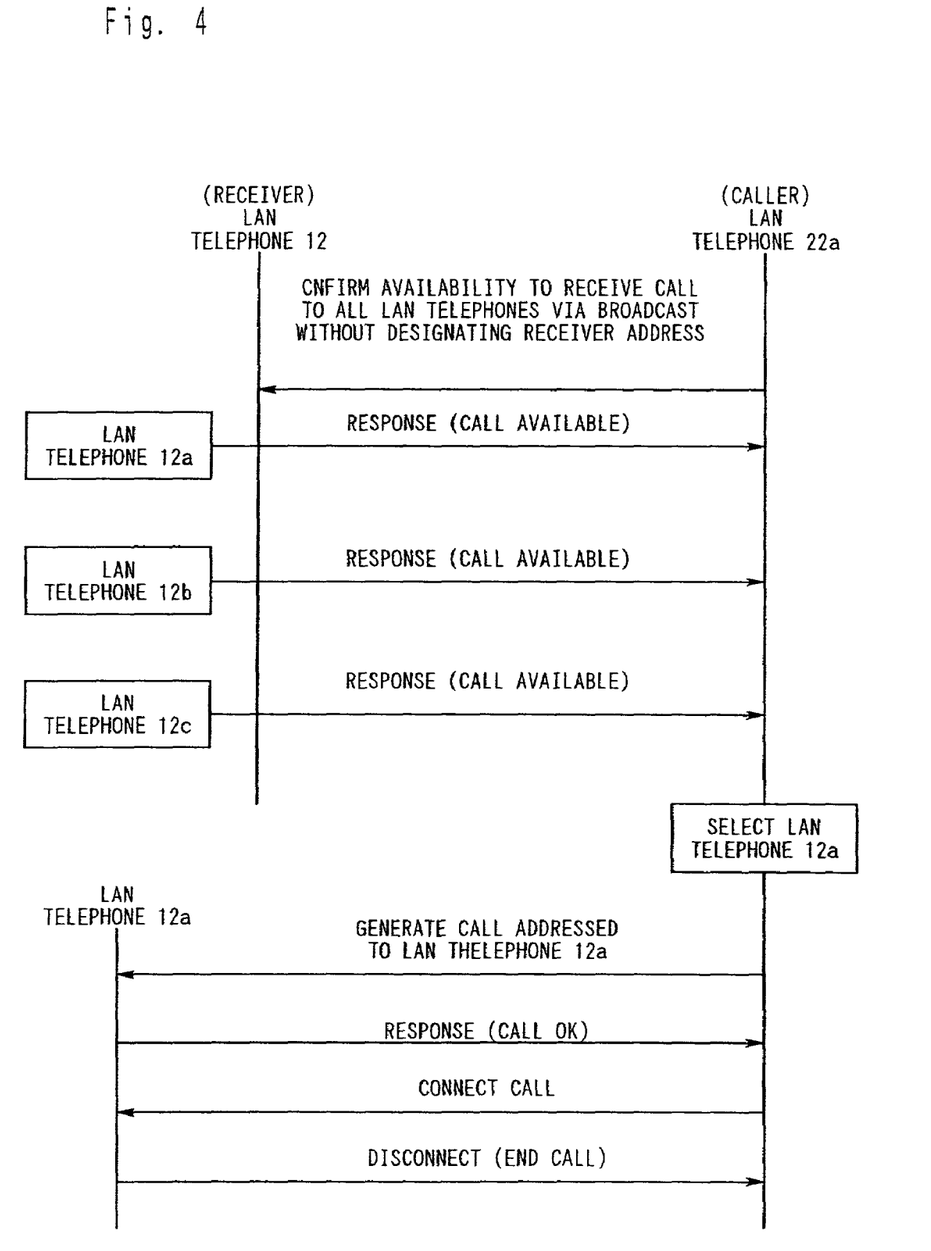
FIG. 4 is an explanatory view showing one example of the operation of the LAN telephone according to embodiment 2.
Figure 5:
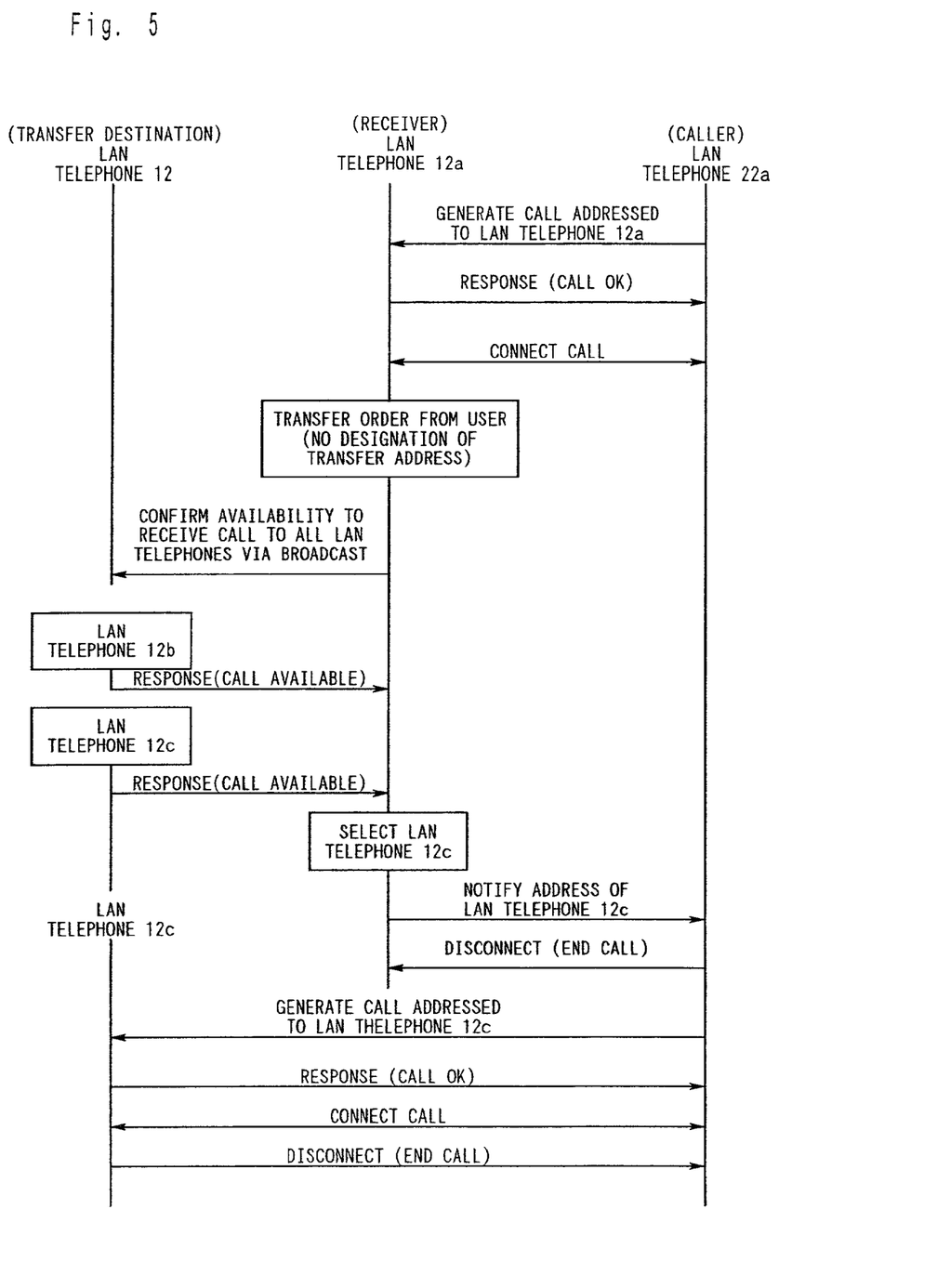
FIG. 5 is an explanatory view showing one example of the operation of the LAN telephone according to embodiment 3.
Figure 6:
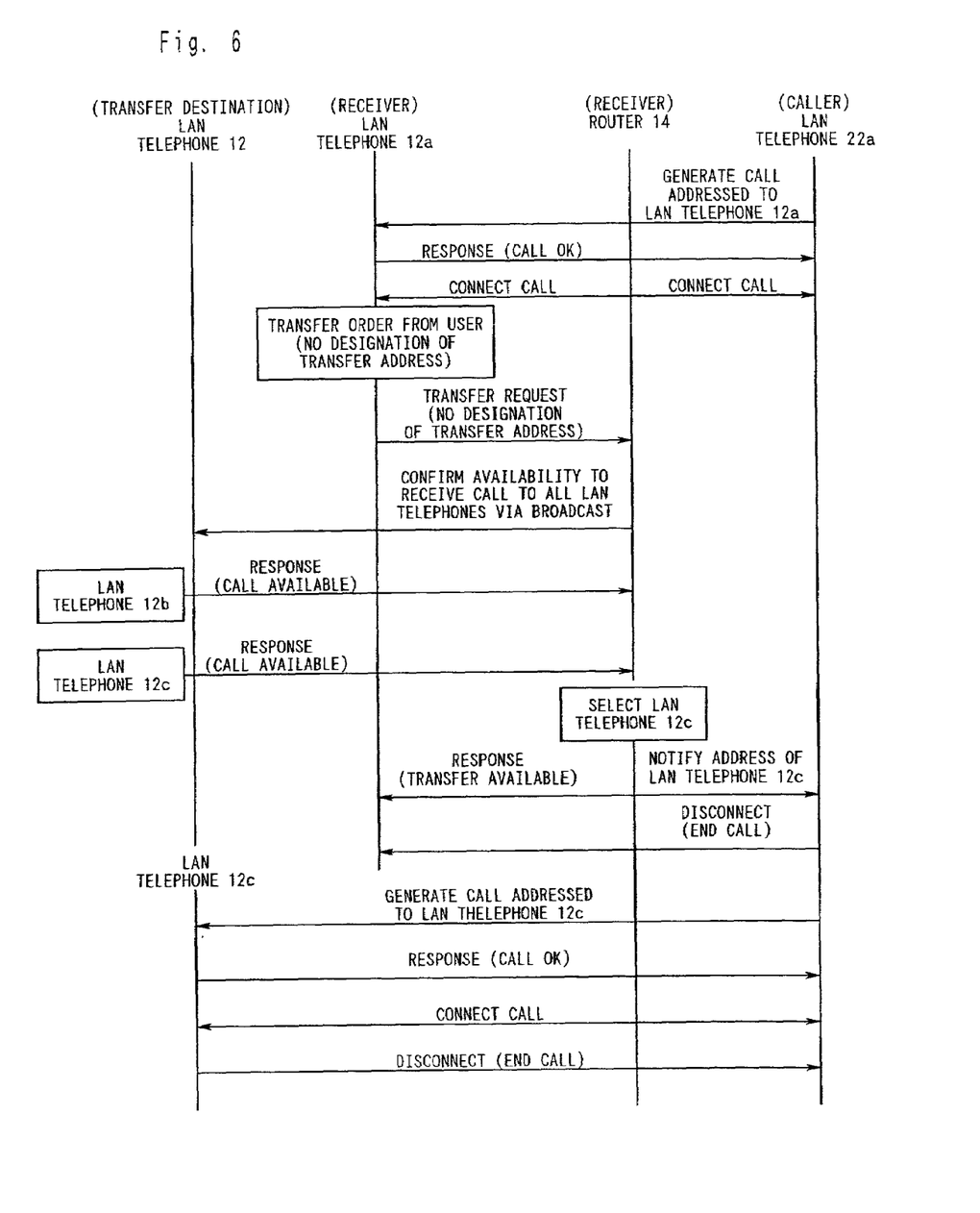
FIG. 6 is an explanatory view showing one example of the operation of the router according to embodiment 4.

FIGS. 1 through 7 are referred to in explaining the embodiments of the repeating device (router), the telephone, and the recording medium according to the present invention. FIG. 1 is an explanatory view showing the functional structure of a logical block of the router according to embodiment 1. FIG. 2 is an explanatory view showing one example of the operation of the router according to embodiment 1. FIG. 3 is an explanatory view showing the functional structure of the logical block of the LAN telephone according to embodiment 2. FIG. 4 is an explanatory view showing one example of the operation of the LAN telephone according to embodiment 2. FIG. 5 is an explanatory view showing one example of the operation of the LAN telephone according to embodiment 3. FIG. 6 is an explanatory view showing one example of the operation of the router according to embodiment 4. FIG. 7 is an explanatory view showing the minimum system environment in which the LAN telephone and the repeating device operate.

Embodiment 1 will now be explained. A router 14 which functions as the repeating device in the present embodiment comprises a function for requesting to a plurality of receiver telephones to reply whether they are capable of receiving a call or not, a function for selecting the telephone to connect the call to out of the plurality of receiver telephones that responded, and a function for notifying the address of the selected receiver telephone to the caller telephone. The functional structure of the logical block of the router 14 according to the present embodiment comprises, as shown in FIG. 1, a CPU 141 having a structure of a microcomputer that facilitates the send-receive of communication data by controlling the whole unit, a RAM 142 functioning as a memory for logical memory, an EEPROM 143 which is a storage memory, an LED 144 and an LCD 145 that show the status of the present unit, a subscriber line (ISDN) and a 10 BASE-T (LAN), and a clock 146. The router 14 further comprises a controller 150 that physically controls the subscriber line (ISDN), a controller 151 that physically controls the 10 BASE-T, and a controller 152 that physically controls the RS-232C. Moreover, the router 14 comprises a network controller 147 and a 10 BASE-T controller 151 for controlling the data being sent to or received from the subscriber line (ISDN), a LAN controller 148 that controls the data being sent to or received from the 10 BASE-T (LAN), and a RAM 149 which is used as the memory in which the network controller 147 or the LAN controller 148 store the send-receive data.

One example of the environment in which the router 14 of embodiment 1 is used is shown in FIG. 7. FIG. 7 shows the minimum system environment in which the LAN telephones etc. operate, constituted of local area networks LAN 10 and LAN 20 having different subnet addresses, communication terminal PCs (personal computers) 11 and 21 connected to each LAN, ISDN circuits 41 and 42, an ISDN 3, routers 14 and 24 utilized as repeating devices, receiver-side LAN telephones 12*a*–12*c*, and caller-side LAN telephones 22*a*–23.

One example of the operation of router 14 in embodiment 1 is explained with reference to FIG. 2. In the embodiment, router 14 receives communication from one of the LAN telephones (in which the address is not specified). When a call addressed to the router 14 is received from the caller LAN telephone 22*a*, the router 14 receiving the call determines that since the call is addressed to the router 14 the call does not specify the receiver LAN telephone, and the router 14 issues a broadcast for confirming to all the LAN telephones 12*a*–12*c* whether they are capable of receiving a call or not, and waits for their reply. Upon receiving the broadcast, each LAN telephone 12*a*–12*c* rings a call bell, and if the user replies the LAN telephone returns a "reply (call available)" to the router 14 (in the present example, all the telephones 12*a*–12*c* are available for the call). Upon receiving the call available reply, the router 14 selects one telephone out of the LAN telephones 12*a*–12*c* that responded, so as to connect the call (the selection can be performed for example based on the priorities set to the LAN telephones). In the present example, LAN telephone 12*a* is selected, and the address of the LAN telephone 12*a* is notified to the caller LAN telephone 22*a*. Upon receiving the notice, the caller LAN telephone 22*a* generates a call addressed to the LAN telephone 12*a*. When the LAN device 12*a* receives the call, it returns a "reply (call OK)". Upon receiving the "reply (call OK)", the caller LAN telephone 22*a* starts the communication using the VoIP protocol. Thus, the router 14 is capable of selecting the LAN telephone 12*a*, and the caller LAN telephone 22*a* can communicate with the selected LAN telephone 12*a*.

Embodiment 2 will now be explained. The telephone according to the present embodiment is capable of generating a call to a plurality of receiver telephones connected to a local area network without specifying the receiver, and comprises a function for requesting to a plurality of receiver telephones to reply their availability to receive a call, a function for selecting the telephone to connect the call to out of the plurality of receiver telephones that responded, and a function for generating the call to the address of the selected telephone. The telephone 22*a* according to the present embodiment is similar to the receiver LAN telephone 12*a*, and the function structure of the logical block thereof is shown in FIG. 3. The LAN telephone of embodiment 2 comprises a CPU 121 having a structure of a microcomputer that facilitates the send-receive of communication data by controlling the whole unit, a RAM 122 functioning as a memory for logical memory, an EEPROM 123 which is a storage memory, an LED 124 and an LCD 125 that show the status of the present unit, a subscriber line (ISDN) and a 10 BASE-T (LAN), and a clock 126. Further, the present telephone comprises a LAN controller 127 that controls the send-receive data with the 10 BASE-T (LAN), and a controller 128 for physically controlling the 10 BASE-T. The telephone further comprises a microphone 129 and a speaker 130 that control the voice from the exterior.

One example of the operation of the telephone in embodiment 2 is explained with reference to FIG. 4. In the embodiment, the caller LAN telephone 22*a* which is the telephone according to the present embodiment issues a broadcast without designating the address confirming to all the LAN telephones 12*a*–12*c* connected to the LAN 10 whether they are capable of receiving a call or not, and waits for their reply. Upon receiving the broadcast, each LAN telephone 12*a*–12*c* rings a call bell, and if the user replies the LAN telephone returns a "reply (call available)" to the receiver LAN telephone 22a (in the present example, all the telephones 12a–12c are available for the call). Upon receiving the call available reply, the caller LAN telephone 22a selects one telephone out of the LAN telephones 12a–12c that responded, so as to connect the call (the selection can be performed for example based on the priorities set to the LAN telephones). In the present example, LAN telephone 12a is selected, and the caller LAN telephone 22a generates a call addressed to the LAN telephone 12a. When the LAN device 12a receives the call, it returns a "reply (call OK)". Upon receiving the "reply (call OK)", the caller LAN telephone 22a starts the communication using the VoIP protocol. Thus, the caller LAN telephone 22a is capable of selecting the LAN telephone 12a and communicating with the selected LAN telephone 12a.

Embodiment 3 will now be explained. The telephone according to the present embodiment comprises a function for requesting upon receiving a transfer order from a user a response to a plurality of receiving telephones asking their availability to receive a call, a function for selecting a telephone for connecting the call out of the receiving telephones that responded, and a function for notifying the address of the selected telephone to the caller telephone. When there is no address designated by the user when the user orders a transfer, the telephone itself can search for the destination of transfer. As shown in FIG. 3, the functional structure of the logical block of the telephone is similar to that of embodiment 2, and the explanation thereof is omitted.

The operation of the telephone according to embodiment 3 will be explained with reference to FIG. 5. While a call is connected between the caller LAN telephone 22a and the receiver LAN telephone 12a of the present embodiment, if the user orders transfer at the LAN telephone 12a and when no transfer address is designated, the LAN telephone 12a issues a broadcast confirming to all the LAN telephones 12 connected to the LAN 10 (excluding itself, which is telephone 12a) whether they are available for receiving a call, and waits for their reply. Upon receiving the broadcast, each LAN telephone 12b–12c rings a call bell, and if the user replies the LAN telephone returns a "reply (call available)" to the LAN telephone 12a (in the present example, all the telephones are available for the call). Upon receiving the call available reply, the caller LAN telephone 12a selects one telephone out of the LAN telephones that responded, so as to connect the call (the selection can be performed for example based on the priorities set to the LAN telephones). In the present example, LAN telephone 12c is selected, and the address of the LAN telephone 12c is notified to the caller LAN telephone 22a. When the LAN telephone 22a receives the notice, it disconnects the call with the LAN telephone 12a and generates a call addressed to the LAN telephone 12c. When the LAN telephone 12c receives the call, it returns a "reply (call OK)". Upon receiving the "reply (call OK)", the caller LAN telephone 22a starts the communication using the VoIP protocol, and the transfer process is completed. Thus, the LAN telephone 12a can select the LAN telephone 12c, and the caller LAN telephone 22a can communicate with the selected LAN telephone 12c.

Embodiment 4 will now be explained. The router functioning as the repeating device in the present embodiment comprises a function for requesting a reply to a plurality of receiving telephones asking their availability to receive a call, a function for selecting one telephone out of the receiving telephones that replied for connecting the call, a function for notifying the address of the selected receiving telephone to the caller telephone, and a function for receiving the transfer request from the user. The present router differs from the router of embodiment 1 in that it holds a function for receiving the transfer request from the user. When the user requests a transfer without designating the receiver address from the caller telephone and the telephone sends the transfer request to the repeating device, the repeating device of the present embodiment can search for a transfer destination and process the transfer. The functional block of the present embodiment is similar to that of embodiment 1 as shown in FIG. 1, and the explanation thereof is omitted.

One example of the operation by the repeating device according to embodiment 4 will be explained with reference to FIG. 6. While a call is connected between the caller LAN telephone 22a and the receiver LAN telephone 12a, if the user orders transfer at the LAN telephone 12a and when no transfer address is designated, the LAN telephone 12a transmits a "transfer request (no transfer address designated)" to the router 14 of the present embodiment. Upon receiving the "transfer request (no transfer address designated)", the router 14 issues a broadcast confirming to all the LAN telephones 12 connected to the LAN 10 (excluding telephone 12a connected to the call) whether they are available for receiving a call, and waits for their reply. Upon receiving the broadcast, each LAN telephone 12b–12c rings a call bell, and if the user replies the LAN telephone returns a "reply (call available)" to the router 14. In the present example, all the telephones are available for the call. Upon receiving the call available reply, the router 14 selects one telephone out of the LAN telephones that responded, so as to connect the call (the selection can be performed for example based on the priorities set to the LAN telephones). In the present example, LAN telephone 12c is selected, and the address of the LAN telephone 12c is notified to the caller LAN telephone 22a. When the LAN telephone 22a receives the notice, it disconnects the call with the LAN telephone 12a and generates a call addressed to the LAN telephone 12c. When the LAN telephone 12c receives the call, it returns a "reply (call OK)". Upon receiving the "reply (call OK)", the caller LAN telephone 22a starts the communication using the VoIP protocol, and the transfer process is completed. Thus, the router 14 can select the LAN telephone 12c, and the caller LAN telephone 22a can communicate with the selected LAN telephone 12c.

The above embodiments explained the cases where the invention is applied to the repeating device and the telephones, but it is also possible to store to a recording medium that can be read by a computer (for example, a CD-ROM) a program that realizes any of the following sets of functions by the computer: a function for requesting a response to the plurality of receiver telephones asking their availability to receive a call, a function for selecting the telephone for connecting the call out of the receiving telephones that responded, and a function for notifying the address of the selected receiver telephone to the caller telephone; a function for requesting a response to the plurality of receiver telephones asking their availability to receive a call, a function for selecting the telephone for connecting the call out of the receiving telephones that responded, and a function for generating a call to the address of the selected telephone; or a function for requesting upon receiving the transfer request from a user a response to the plurality of receiver telephones asking their availability to receive a call, a function for selecting the telephone for connecting the call out of the receiving telephones that responded, and a function for notifying the address of the selected telephone to the caller telephone. By using this recording medium, a device for relaying the call addressed to a plurality of receiver telephones connected to a local area network, a telephone being connected to the local area network, and a telephone capable of generating a call to the plurality of receiver telephones connected to the local area network without designating the receiver address can all function as the repeating device and the telephone set according to the present invention.

According to the present invention, in a communication system enabling communication between LAN telephones by providing a relay device in a local area network or by relaying local area networks that have different subnet addresses by a communication line, the present invention enables to provide a repeating device and a telephone that are capable of selecting the receiver telephone without having to designate the receiver address.

We claim:

1. A repeating device for relaying communication to a plurality of receiver-side telephones connected to a local area network;
   said repeating device comprising a function, effected at a time of an incoming call to be connected, for requesting that each receiver-side telephone unit of said plurality of receiver-side telephones then respond indicating their instantaneous operational capability to receive the incoming call, a function for selecting, out of the plurality of receiver-side telephones that responded, a receiver side telephone unit to which the incoming call is to be connected, and a function for notifying the caller-side telephone of the address of the selected receiver-side telephone unit to which the incoming call is to be generated, before the incoming call to the receiver side telephone unit is generated.

2. A repeating device according to claim 1, wherein said repeating device comprises a function for receiving a transfer request from a user.

3. A telephone/router pair capable of assisting a call to a plurality of receiver-side telephones connected to a local area network, without a caller-side telephone designating the address of a receiver-side telephone unit;
   said telephone/router pair comprising a function, effected at a time of a call to be connected, for requesting that each receiver-side telephone unit of said plurality of receiver-side telephones then respond indicating their instantaneous operational capability to receive the call, a function for selecting, out of the plurality of receiver-side telephones that responded, a receiver-side telephone unit to which the call is to be connected, a function for notifying the caller-side telephone of the address of the selected receiver-side telephone unit to which the incoming call is to be generated, before the incoming call to the receiver side telephone unit is generated, and
   the caller-side telephone thereafter being enabled to effect a function for generating the call addressed to said selected receiver-side telephone unit.

4. A telephone connected to a local area network;
   said telephone comprising a function, effected at a time of receiving a call transfer request from a user of a caller-side telephone, for requesting that each receiver-side telephone unit of a plurality of receiver-side telephones then respond indicating their instantaneous operational capability to receive a call, a function for selecting, out of the plurality of receiver-side telephones that responded, a receiver-side telephone unit to which the call is to be connected, and a function for notifying the caller-side telephone of the address of the selected receiver-side telephone unit to which the incoming call is to be generated, before the incoming call to the receiver side telephone unit is generated.

5. A recording medium capable of being read by a machine and storing a program to be executed by said machine, to assist a caller-side telephone to make an incoming call without having to specify the address of a receiver-side telephone unit,
   wherein said recording medium comprises programming to effect at least one of:
   a virtual device for relaying communication to a plurality of receiver-side telephones connected to a local area network, for effecting a function at a time of an incoming call to be connected, for requesting that each receiver-side telephone unit of said plurality of receiver-side telephones then respond indicating their instantaneous operational capability to receive the incoming call, a function for selecting, out of the plurality of receiver-side telephones that responded, a receiver-side telephone unit to which the incoming call is to be connected, and a function for notifying the caller-side telephone of the address of the selected receiver-side telephone unit to which the incoming call is to be generated, before the incoming call to the receiver side telephone unit is generated;
   a virtual telephone/router pair connected to a local area network, for effecting a function, a time of a call to be connected, for requesting that each receiver-side telephone unit of said plurality of receiver-side telephones then respond indicating their instantaneous operational capability to receive the call, a function for selecting, out of the plurality of receiver-side telephones that responded, a receiver-side telephone unit to which the call is to be connected, a function for notifying the caller-side telephone of the address of the selected receiver-side telephone unit to which the incoming call is to be generated, before the incoming call to the receiver side telephone unit is generated, to thereafter enable the caller-side telephone to effect a function for generating the call addressed to said selected receiver-side telephone unit; or
   a telephone capable of generating a call to a plurality of receiver-side telephones connected to a local area network, for effecting a function at a time of receiving a call transfer request from a user of a caller-side telephone, for requesting that each receiver-side telephone unit of a plurality of receiver-side telephones then respond indicating their instantaneous operational capability to receive a call, a function for selecting, out of the plurality of receiver-side telephones that responded, a receiver-side telephone unit to which the call is to be connected, and a function for notifying the caller-side telephone of the address of the selected receiver-side telephone unit to which the incoming call is to be generated, before the incoming call to the receiver side telephone unit is generated.

* * * * *